US009161162B2

(12) United States Patent
Liu et al.

(10) Patent No.: US 9,161,162 B2
(45) Date of Patent: Oct. 13, 2015

(54) ESTIMATING THE GEOGRAPHICAL POSITION OF AN APPARATUS BASED ON ITS PROXIMITY TO OTHER APPARATUSES

(75) Inventors: Dong Liu, Beijing (CN); Hao Yang, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 164 days.

(21) Appl. No.: 13/995,258

(22) PCT Filed: Dec. 29, 2010

(86) PCT No.: PCT/CN2010/080418
§ 371 (c)(1),
(2), (4) Date: Jun. 18, 2013

(87) PCT Pub. No.: WO2012/088667
PCT Pub. Date: Jul. 5, 2012

(65) Prior Publication Data
US 2013/0273943 A1 Oct. 17, 2013

(51) Int. Cl.
*H04W 24/00* (2009.01)
*H04W 4/02* (2009.01)
*H04W 64/00* (2009.01)

(52) U.S. Cl.
CPC ............... *H04W 4/02* (2013.01); *H04W 64/00* (2013.01)

(58) Field of Classification Search
CPC ... H04W 64/00; H04W 36/32; H04W 64/003; H04W 4/02; G01C 21/28; H04B 5/0062; H04N 1/00342; G01S 11/06; G01S 5/0284
USPC ............................................. 455/456.1–457
See application file for complete search history.

(56) References Cited

U.S. PATENT DOCUMENTS

| 6,504,503 | B1 | 1/2003 | Saint-Hilaire et al. |
| 6,975,873 | B1 * | 12/2005 | Banks et al. ............... 455/456.5 |
| 2002/0055362 | A1 * | 5/2002 | Aoyama ....................... 455/456 |
| 2005/0059410 | A1 | 3/2005 | Trossen et al. |

(Continued)

FOREIGN PATENT DOCUMENTS

| CN | 1638311 A | 7/2005 |
| CN | 101189890 A | 5/2008 |
| WO | 2009145211 A1 | 12/2009 |

OTHER PUBLICATIONS

International Search Report received for corresponding Patent Cooperation Treaty Application No. PCT/CN2010/080418, dated Oct. 13, 2011, 9 pages.
Hooke, R. et al.; 'Direct Search' Solution of Numerical and Statistical Problems; 8 *J. Ass. Comput. Mach.* (1961) 212-29.

(Continued)

*Primary Examiner* — Allahyar Kasraian
(74) *Attorney, Agent, or Firm* — Alston & Bird LLP

(57) ABSTRACT

An example apparatus, such as a position server, is caused to receive proximity information from a number of mobile apparatuses located remote from the apparatus, and receive observed current locations from at least some but not all of the mobile apparatuses. The apparatus is also caused to determine a proximity relation between certain ones of the number of mobile apparatuses, where the proximity is reflected by the proximity information received from the mobile apparatuses. And the apparatus is caused to calculate an estimate of a current location of at least one of the one or more remaining mobile apparatuses as a function of the proximity relation between certain ones of the number of mobile apparatuses, and as a function of the observed current locations of the one or more mobile apparatuses.

20 Claims, 4 Drawing Sheets

(56) References Cited

U.S. PATENT DOCUMENTS

| | | | |
|---|---|---|---|
| 2005/0136946 A1 | 6/2005 | Trossen et al. | |
| 2006/0258371 A1 | 11/2006 | Krishnamurthi et al. | |
| 2008/0014963 A1* | 1/2008 | Takizawa et al. | 455/456.1 |
| 2009/0023459 A1 | 1/2009 | Wigren | |
| 2009/0075675 A1 | 3/2009 | Kim et al. | |
| 2009/0227270 A1 | 9/2009 | Naaman | |
| 2010/0105409 A1 | 4/2010 | Agarwal et al. | |
| 2010/0120394 A1 | 5/2010 | Mia et al. | |
| 2010/0306320 A1 | 12/2010 | Leppanen et al. | |
| 2015/0113065 A1* | 4/2015 | Jennings et al. | 709/204 |

OTHER PUBLICATIONS

Zhang, Pei, et al.; "LOCALE: Collaborative Localization Estimation for Sparse Mobile Sensor Networks"; *IEEE Computer Society; 2008 International Conference on Information Processing in Sensor Networks*; 2008; pp. 195-206.

Location Based Services Part II: LBS Network Architectures [online] [retrieved from Dec. 20, 2010]. Retrieved from the Internet: <URL: http://www4gwirelessjobs.com/articles/article-detail.php?Location_B...>. (Dated Jan. 12, 2010) 7 pages.

Written Opinion from International Application No. PCT/CN2010/080418 dated Oct. 13, 2011.

* cited by examiner

ESTIMATING THE GEOGRAPHICAL POSITION OF AN APPARATUS BASED ON ITS PROXIMITY TO OTHER APPARATUSES

RELATED APPLICATION

This application was originally filed as Patent Cooperation Treaty Application No. PCT/CN2010/080418 filed Dec. 29, 2010.

TECHNICAL FIELD

Example embodiments of the present invention generally relate to positioning apparatuses networks and, more particularly, relate to positioning an apparatus based on its proximity to other apparatuses.

BACKGROUND

In many wireless communication networks and other mobile networks, it is typically possible to determine the geographic location of the mobile terminals, and provide location-based or location-aware services based upon the location of the mobile terminals. Location-based services are those in which the location information of the mobile terminal is a fundamental enabler for offering the services. Examples of these are fleet management/tracking, find-a-friend services, location based games, and navigation services. Location-aware services are services in which available location information of the mobile terminal will enhance the usability of existing services, making them more attractive and easy to use. The location information is not a fundamental enabler for offering these kinds of services. Examples of this category are location based weather forecasts, restaurant finders, and city guides.

In various applications, service announcements can be transmitted to mobile terminals on the basis of a service request of a subscriber in a mobile communication system. Generally, the provision of these chargeable services is most often arranged from outside the actual mobile communication system. By making a call to a required service number or sending a request over the Internet, for example, a mobile subscriber is able to order a selected service announcement to be delivered to the mobile terminal, such as via the display of the mobile terminal. A number of these individual services, e.g., weather forecast, traffic announcements, local news and other local services, such as taxi ordering, service station announcements and so on, are services where the mobile subscriber selects the desired announcement on the basis of the geographic area. The mobile subscriber generally wishes to have the service announcement related to his/her current location which varies because of the mobile nature of the mobile subscriber.

Numerous means of obtaining information about a current location of a mobile terminal are becoming more widely available for use on mobile terminals. Examples of such means include cell identity location (cell ID), triangulation, Observed Time Difference of Arrival (OTDOA), Time of Arrival (TOA), Global Positioning System (GPS), Assisted-GPS or the like. However, a number of existing means for obtaining information about the current location of a mobile terminal may have coverage issues, whether indoors or outdoors, require a specific infrastructure or be incapable of providing location information with sufficient accuracy. Even further, some mobile terminals may not be equipped with the capability to obtain or otherwise provide information regarding their current location.

BRIEF SUMMARY

In view of the foregoing background, one aspect of example embodiments of the present invention is directed to an apparatus including at least one processor and at least one memory including computer program code configured to, with processor(s), cause the apparatus to at least perform a number of operations. The apparatus is caused to receive proximity information from a number of mobile apparatuses located remote from the apparatus, and receive geographical location information from at least some but not all of the mobile apparatuses. The proximity information received from each mobile apparatus indicates any other mobile apparatuses in proximity of the mobile apparatus, and the geographical location information received from each mobile apparatus of the at least some of the mobile apparatuses includes an observed current location of the respective mobile apparatus. In one example, the apparatus may be further caused to prepare a request for transmission to at least one of the number of apparatuses, and in this example, the apparatus may be caused to receive the proximity information and/or geographical information from the respective apparatus(es) in response to the request.

The apparatus is also caused to determine a proximity relation between certain ones of the number of mobile apparatuses, where the proximity is reflected by the proximity information received from the mobile apparatuses. In one example, the proximity information received from each mobile apparatus may identify any other mobile apparatuses discovered by the mobile apparatus as being in proximity of the mobile apparatus. In this example, the apparatus may be caused to, for at least one mobile apparatus, relate the mobile apparatus and any other mobile apparatuses identified in the proximity information received from the mobile apparatus. In another example, the proximity information received from each mobile apparatus identifies any access points discovered by the mobile apparatus as being in proximity of the mobile apparatus. In this other example, the apparatus may be caused to relate at least one and another of the mobile apparatuses in an instance in which the proximity information received from the respective mobile apparatuses identifies at least one common access point.

The apparatus is further caused to calculate an estimate of a current location of at least one of the one or more remaining mobile apparatuses as a function of the proximity relation between certain ones of the number of mobile apparatuses, and as a function of the observed current locations of the one or more mobile apparatuses. In one example, the apparatus may be caused to solve an optimization problem including an objective function and a set of constraints. In this example, the objective function may be defined to minimize the sum of absolute values of acceleration of the number of terminals at a plurality of time instances, with the constraints being defined to match the observed current locations of the at least some of the mobile apparatuses, and the proximity relation between certain ones of the number of mobile apparatuses. In another example, the apparatus may be caused to solve an optimization problem including an objective function without any constraints. In this example, the objective function may be defined to maximize the probabilities of a number of random events, including that the observed current locations are accurate, and that the proximity relation between certain ones of the number of mobile apparatuses is accurate.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
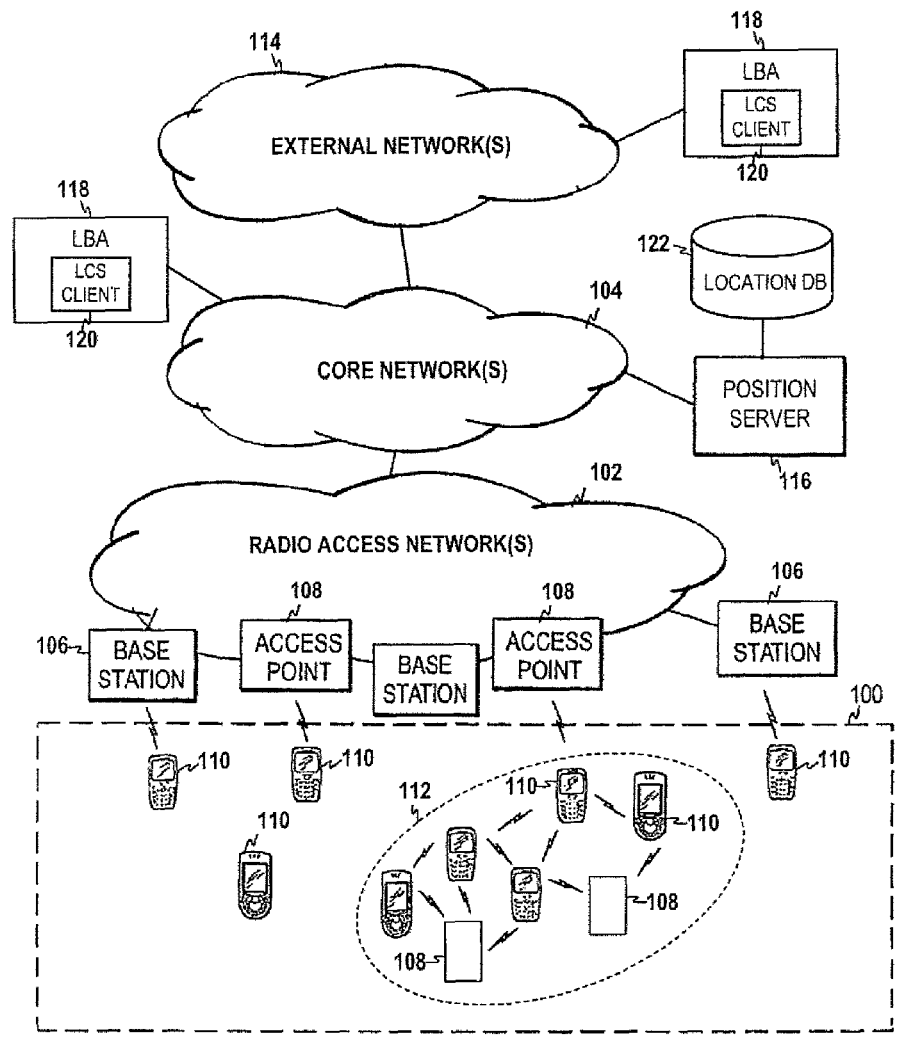
FIG. 1 illustrates a general communication environment according to example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/or stored. Likewise, the terms "location," "position," "geographical location," "geographical position," and similar terms may be used interchangeably, according to some example embodiments of the present invention. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory/memories that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

FIG. 1 illustrates a general communication environment in which example embodiments of the present invention may be applied. The communication environment includes three interacting domains: a user equipment domain 100, an access domain including one or more radio access networks 102, and a backbone domain including one or more core networks 104.

The above communication environment may include a mobile network and one or more short-range wireless networks, and may therefore include one or more base stations 106 (or node B elements), access points 108 or the like. Examples of these networks may include 3rd Generation Partnership Project (3GPP) radio access networks, Universal Mobile Telephone System (UMTS) radio access UTRAN (Universal Terrestrial Radio Access Network), Global System for Mobile communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3rd Generation (3G) or 3.9G (also referred to as UTRAN Long Term Evolution (LTE) or Super 3G) or E-UTRAN (Evolved UTRAN) networks. Generally, a radio access network may refer to any 2nd Generation (2G), 3G, 4th Generation (4G) or higher generation mobile communication network and their different versions, radio frequency (RF) or any of a number of different wireless networks, as well as to any other wireless radio access network that may be arranged to interwork with such networks.

The user equipment domain 100 may include a plurality of mobile terminals 110. In this context, the terminals may or may not be multimode terminals. A multimode terminal here may refer to a terminal that has at least two operation modes, e.g., at least two radio interfaces based on different connectivity standards. Although one operation mode may be provided for communicating with the mobile network, the terminal may also be provided with one or more other operation modes, in which a short-range radio of the terminal may be active. The terminals may have different states with respect to each operation mode, and the states allowed concurrently depend on the implementation of the terminal.

The mobile terminals 110 may also form one or more proximity networks 112 in which the terminals may communicate directly or indirectly with each other, such as in accordance with various ones of the above manners by which the radio access networks may be configured to communicate. More particularly, for example, the terminals forming a proximity network may communicate with each other in accordance with RF, Bluetooth, IrDA, LAN, WLAN, WiMAX, UWB techniques or the like. In one example, terminals may be considered part of the same proximity network although the terminals may not directly communicate with one another, such as in the case of terminals coupled to a common access point 108. The terminals forming a proximity network may be individually connected to a radio access network 102 through one or more base stations 106 (or node B elements), access points or the like of the access domain.

The radio access network 102 and/or the core network 104 may further be connected to one or more external networks 114, such as the Internet. The core network, external network and/or proximity network 112 may include one or more service providers, servers or the like. These other apparatuses may include, for example, one or more position servers 116 and/or one or more location-based applications (LBAs) 118, as explained below. It should be understood that although the term "position server" is defined by 3GPP2, this and other terms are used herein without loss of generality to the functions performed by respective entities. As explained herein, the position server coordinates location services for different applications or LBAs, which are co-located or otherwise in communication with respective LoCation Services (LCS) clients 120.

In general terms, the position server 116 may be an entity adapted to provide information concerning the geographical locations of mobile terminals 110. The position server may be configured to receive or otherwise determine a given mobile terminal's location information. Although the position server may be described herein as being configured to determine location information, in various example embodiments, the position server may be coupled to a position determining entity such as, for example, a serving mobile location center (SMLC), evolved SMLC (E-SMLC) or the like, which may be configured to determine the location information provided by the position server. The geographical location may be defined on the basis of the position of the mobile terminal relative to a base station 106 or access point 108 of the access domain.

The geographical location of the base station 106, access point 108 and/or mobile terminal 110 may be defined, for example, in X and Y coordinates or in latitudes and longitudes. A possibility is to use the relation between defined radiuses and angles, e.g. based on the spherical coordinate system or the like. It is also possible to define the location of the base stations, access points and/or mobile terminals in vertical directions. For example, Z coordinate may be used when providing the location information in the vertical direction. The vertical location may be needed such as to define the location in mountainous environments or in cities with tall buildings. The location information may include observed location information, such as cell identity location (cell ID), triangulation, Observed Time Difference of Arrival (OT-DOA), Time of Arrival (TOA), Global Positioning System (GPS), Assisted-GPS or the like. This information may be processed in a predefined manner and then provided to the position server 116, which may store the location information in a location database (DB) 122 and/or forward the information to the LBA/LCS client 120.

The position server 116 may include any of a number of known elements in the wireless communications network such as, for example, a gateway mobile location center (GMLC). The position server may be configured to receive a request for location information, such as from a LBA/LCS client 120. In an instance in which the LBA/LCS client is authorized to receive the location information, the position server may determine the location of the mobile terminal, such as based upon predefined information concerning the location of the mobile terminal 110. This information may include an identifier (ID) of the mobile terminal or its user, such as an international mobile equipment identity (IMEI), international mobile subscriber identity (IMSI), or a temporary identifier, such as a temporary international mobile subscriber identifier (TIMSI). Alternatively, a mobile terminal can be identified by Network Address Identifiers and other standard IP-based identifying mechanisms or mechanisms that are specific to LCS specifications.

Although shown as being coupled to a core network 104, it should be appreciated that the position server 116 functionality may be implemented anywhere in the system. The position server implementation may be by a single apparatus or distributed between several apparatuses of the system (e.g., position server, position determining entity). The position server may also be an external apparatus to the system. In one example, the mobile terminal 110 may provide the position server to determine the geographical location of the mobile terminal. The mobile terminal may be provided with the position server processing function and be configured to generate and transport location information to the position server for storage and/or management of the information, such as to supply the information to a requesting LBA/LCS client 120 for use thereat.

The position server 116 may include a number of location service components and bearers needed to serve the LBA/LCS client 120. The position server may provide a platform which will enable the support of location based services in parallel with other wireless communication services such as speech, data, messaging, other tele-services, user applications and supplementary services. The position server may respond to a location request from a properly authorized LBA/LCS client with location information for the target mobile terminal 110 specified by the LBA/LCS client if considerations of target mobile terminal privacy are satisfied. The position server may therefore provide the LBA/LCS client; on request or periodically, the current or most recent geographic location (if available) of the target mobile terminal or, if the location determination fails, an error indication and optionally the reason for the failure. A more detailed description of suitable location services, position server and LBA/LCS client configured to implement such services may be found in 3GPP TS 22.071 and 3GPP TS 23.271.

The location information received by the LBA/LCS client 120 may be used for any of a number of different purposes. For example, the LBA/LCS client may transmit location-related information to the mobile terminal 110 in a particular geographic area, such as on weather, traffic, hotels, restaurants, or the like. Also, for example, the LBA/LCS client may record anonymous location information (i.e., without any mobile terminal identifier), such as for traffic engineering and statistical purposes. Further, the LBA/LCS client may enhance or support any of a number of supplementary services, such as an intelligent network (IN) service, bearer service and/or tele-service subscribed to by the mobile terminal subscriber.

The location information can of course be used to determine the location of a mobile terminal 110 when the mobile terminal makes an emergency call. There are also several other possible commercial and non-commercial applications that may use the location information. Such possible applications include different local advertisement and information distribution schemes (e.g. transmission of information directed to those mobile users only who are currently within a certain area), area related WWW-pages (such as time tables, local restaurant, shop or hotel guides, maps, local advertisements etc.) for the users of mobile data processing devices, and tracking of mobile users by anyone who wishes to receive this information and is legally entitled to obtain it. An application requiring real-time location information of the movement of a mobile terminal is a mobile terminal movement prediction feature that the wireless communication network may utilize, for example, in dynamic network resource allocation. There are still various other possible uses of the location information and applications that would benefit from the location information.

Figure 2:
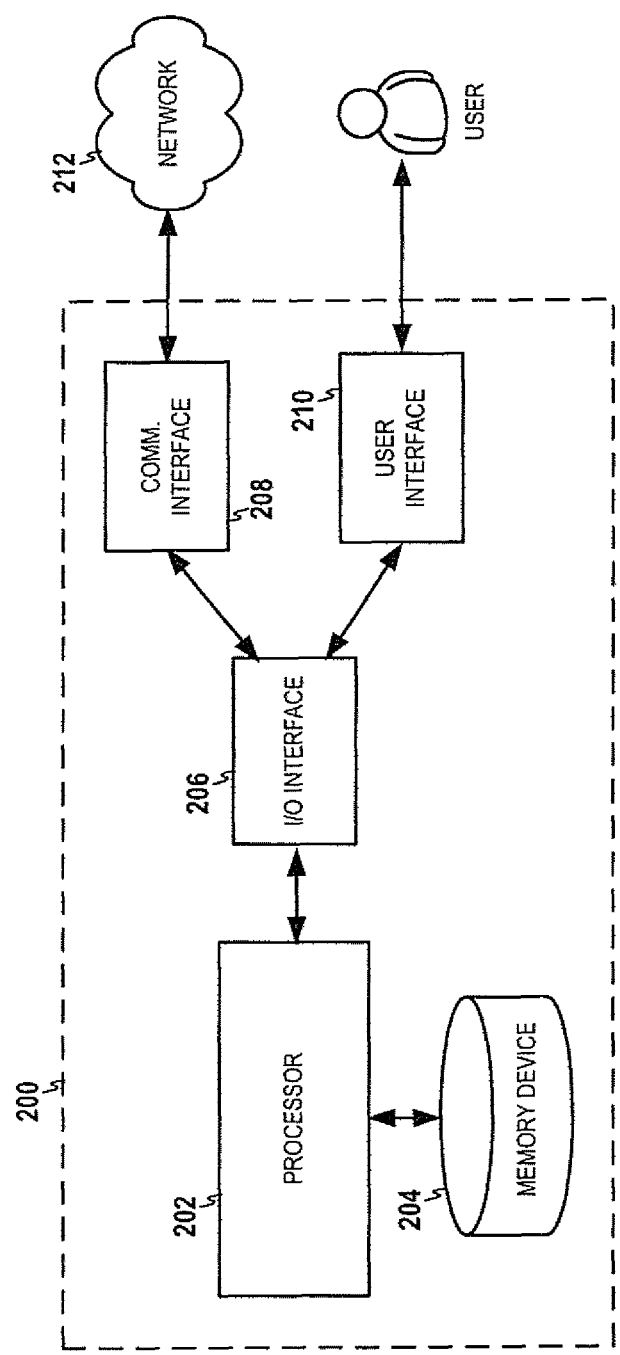
FIG. 2 illustrates an apparatus that may be configured to operate within the communication environment of FIG. 1, according to various example embodiments of the present invention.

Reference is now made to FIG. 2, which illustrates an apparatus 200 according to example embodiments of the present invention configured to perform various operations described herein. As shown and described herein, the example apparatus may be configured to function as or otherwise implement one or more of the network components depicted in FIG. 1 (e.g., base station 106, access point 108, mobile terminal 110, position server 106, LBA 118, LCS 120, etc.). The example apparatus depicted in FIG. 2 may also be configured to perform example methods of the present invention.

In some example embodiments, the apparatus 200 may, be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 202, memory devices 204, Input/Output (I/O) interfaces 206, communications interfaces 208 and/or user interfaces 210 (one of each being shown).

The processor 202 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the apparatus to perform various functionalities described herein.

Whether configured as hardware alone or via instructions stored on a computer-readable storage medium, or by a combination thereof, the processor 202 may be an apparatus configured to perform operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 204 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 202.

Further, the memory device 204 may be configured to store information, data, applications, computer-readable program code instructions, and/or the like for enabling the processor 202 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 206 may be any device, circuitry, or means embodied in hardware, software or a combination of hardware and software that is configured to interface the processor 202 with other circuitry or devices, such as the communications interface 208 and/or the user interface 210. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of an example embodiment of the present invention.

The communication interface 208 may be any device or means embodied in hardware, software or a combination of hardware and software that is configured to receive and/or transmit data from/to one or more networks 212 (e.g., radio access networks 102, core networks 104, external networks 114, etc.) and/or any other device or module (e.g., other similar apparatuses such as to form an proximity network 112) in communication with the example apparatus 200. The processor 202 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 208 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including various ones of those explained above by which the radio access networks and/or proximity networks may be configured to communicate. The communications interface may also be configured to support communications at the network layer, possibly via Internet Protocol (IP).

The user interface 210 may be in communication with the processor 202 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 204). In some example embodiments, the user interface circuitry is configured to facilitate user control of at least some functions of the apparatus 200 through the use of a display (e.g., display apparatus 106) and configured to respond to user inputs. The processor may also comprise, or be in communication with, display circuitry configured to display at least a portion of a user interface, the display and the display circuitry configured to facilitate user control of at least some functions of the apparatus.

In some cases, the apparatus 200 of example embodiments may be implemented on a chip or chip set. In an example embodiment, the chip or chip set may be programmed to perform one or more operations of one or more methods as described herein and may include, for instance, one or more processors 202, memory devices 204, I/O interfaces 206 and/or other circuitry components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

In one example embodiment, the chip or chip set includes a communication mechanism, such as a bus, for passing information among the components of the chip or chip set. In accordance with one example embodiment, the processor 202 has connectivity to the bus to execute instructions and process information stored in, for example, the memory device 204. In instances in which the apparatus 200 includes multiple processors, the processors may be configured to operate in tandem via the bus to enable independent execution of instructions, pipelining, and multithreading. In one example embodiment, the chip or chip set includes merely one or more processors and software and/or firmware supporting and/or relating to and/or for the one or more processors.

As explained in the background section, numerous means of obtaining information about a current location of a mobile terminal 110 are becoming more widely available for use on mobile terminals. Examples of such means include cell ID, triangulation, OTDOA, TOA, GPS, Assisted-GPS or the like. The current location of a mobile terminal obtained by such means may be considered an observed current location. As also explained in the background section, the current location of a number of mobile terminals may at one or more instances be unobservable, such as due to coverage issues, infrastructure requirements or the general lack of suitable equipment. Example embodiments of the present invention therefore provide techniques for calculating an estimation of a mobile terminal based on the observed current location of one or more other mobile terminals in proximity of the respective mobile terminal. These other mobile terminals may include terminals discoverable by the mobile terminal for formation of a proximity network 112, or may be terminals with which the unobserved mobile terminal has formed a proximity network.

Figure 3:
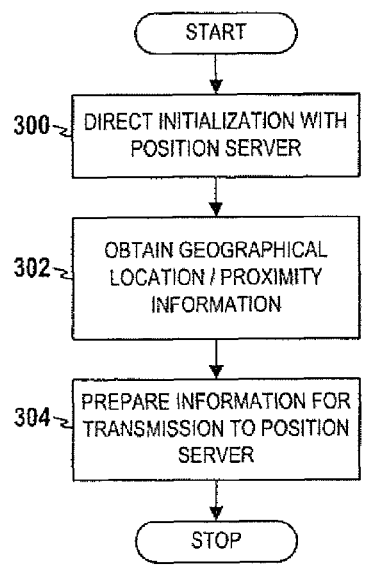
FIGS. 3 and 4 are flowcharts illustrating various operations in the methods of example embodiments of the present invention.

Reference is now made to the flowchart of FIG. 3, which illustrates various operations in a method according to example embodiments of the present invention. As described herein, the method of FIG. 3 may be performed by mobile terminals 110 of FIG. 1, or rather the apparatus 200 of FIG. 2 configured to perform the respective operations of the mobile terminals. It should be understood, however, that the one or more of the operations may be alternatively performed by another apparatus.

As shown at block 300, the method may include means such as the processor 202 for directing initialization of the mobile terminal 110 with a position server 116 such as to receive location-based services. During initialization, the terminal reports to the position server its capabilities regarding obtaining geographical location information and/or proximity information, as well as one or more IDs of the terminal. The terminal may also at this point turn on or otherwise activate any communication interfaces 208 via which the terminal may scan for and detect access points 108, other mobile terminals or the like with which the mobile terminal may form a proximity network.

The capabilities regarding obtaining geographical location information may include, for example, capabilities of the terminal 110 to obtain its observed current location in one or more of a number of different manners such as cell ID, triangulation, OTDOA, TOA, GPS, Assisted-GPS or the like. In one particular example, the capabilities regarding obtaining geographical location information may include an indication that the mobile terminal is equipped to obtain its observed current location by means of GPS. In another particular example, the capabilities regarding obtaining geographical location information may include an indication that the mobile terminal is not equipped to obtain its observed current location by any means.

The capabilities regarding obtaining proximity information may include, for example, capabilities of the terminal 110 to scan and discover access points 108, other mobile terminals or the like with which the mobile terminal may form a proximity network. In one particular example, the capabilities regarding obtaining proximity information may include an indication that the mobile terminal is equipped to scan and discover access points, other terminals or the like by means of IEEE 802.xx and Bluetooth, but not by means of IrDA.

The IDs of the terminal 110 may include any of a number of IDs that may identify the terminal or its user in the core network 104, such as the aforementioned IMEI, IMSI, TIMSI or the like. In addition, the IDs may include any of a number of Ds that may identify the terminal or its user in a proximity network 112, such as a device name or ID, Bluetooth ID, IrDA ID or the like.

Returning to FIG. 3, as shown in block 302, the method may include means such as the processor 202 for obtaining or otherwise receiving geographical location information and/or proximity information according to the capabilities of the respective mobile terminal 110. The geographical location information may include an indication of an observed current location of the terminal, and may be obtained in any of a number of different manners such as those indicated above. The proximity information may include the IDs of any access points 108, other mobile terminals or the like in proximity of the terminal, and with which the terminal is capable of forming or has formed a proximity network. As indicated above, the proximity information may be obtained, for example, by scanning and discovering the respective access points, other mobile terminals or the like.

In one or more instances after obtaining geographical location information and/or proximity information, the method may include means such as the processor 202 for preparing the respective information for transmission to the position server 116, as shown in block 304.

The mobile terminal 110 may obtain geographical location information and/or proximity information, and may prepare the respective information for transmission to the position server 116, periodically or otherwise at its own initiative. In various example embodiments, however, the mobile terminal may receive direction to obtain the respective information such as from the position server, such as in the form of a request from the position server. This may occur, for example, in instances in which a LCS client 120 has requested a more-current location of the mobile terminal than stored by the position server. The mobile terminal may also, for example, receive direction to obtain geographical location information and/or proximity information in instances in which the position server is unable to sufficiently determine or estimate the position of the mobile terminal or another terminal in proximity to the mobile terminal, or determine or estimate the respective position with sufficient accuracy.

In various instances, however, the mobile terminal 110 may not be able to obtain or otherwise may not obtain geographical location information. This may include, for example, instances in which the mobile terminal is not equipped with the capability to obtain such geographical location information. Also, for example, the mobile terminal may not obtain geographical location information in instances in which the mobile terminal is located outside the coverage area within which the terminal may obtain its observed current location, such as in instances in which the terminal is capable of obtaining its observed current location by GPS but the terminal is located indoors outside the range of the GPS.

Figure 4:
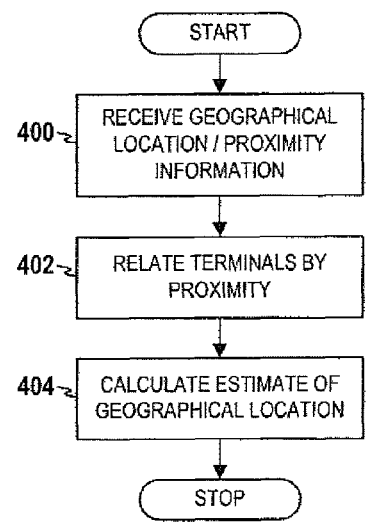

Reference is now made to the flowchart of FIG. 4, which illustrates various operations in a method according to example embodiments of the present invention. As described herein, the method of FIG. 4 may be performed by the position server 116 of FIG. 1, or rather the apparatus 200 of FIG. 2 configured to perform the respective operations of the position server. It should be understood, however, that the one or more of the operations may be alternatively performed by another apparatus.

As shown at block 400, the method may include means such as the processor 202 for receiving geographical location information and/or proximity information from a number of mobile terminals 110. In this regard, geographical location information and proximity information may be received from one or more of the number of mobile terminals, and proximity information without geographical location information may be received from the remaining mobile terminal(s) of the number of mobile terminals.

As shown in block 402, the method may then include means such as the processor 202 for determining a proximity relation between certain ones of the mobile terminals, as reflected by their respective proximity information. For example, a first mobile terminal and second mobile terminal may be related by proximity in an instance in which the first mobile terminal discovers the second mobile terminal as a terminal with which the first mobile terminal may form a proximity network 112, or vice versa. In this instance, the proximity information from the first terminal (or second terminal) may include an appropriate identifier of the second terminal (or first terminal), which the position server 116 may have obtained, for example, during initialization of the second terminal (or first terminal).

In another example, a first mobile terminal and second mobile terminal may be related by proximity in an instance in which both terminals discover one or more common access points 108 as access point(s) with which the respective terminals may form a proximity network 112. In this instance, the proximity information from the first and second terminals may each include an appropriate identifier of the common access point(s). The identifier of an access point may be any of a number of identifiers by which the access point may be identified including, for example, a service set identifier (SSID) of a WLAN to which the access point provides access.

Regardless of the exact manner by which the terminals are related by proximity, the method may include means such as the processor 202 for calculating an estimate of the unobserved current location of each of one or more of the mobile terminals 110. In accordance with example embodiments of the present invention, the estimate(s) of the unobserved current location(s) may be calculated as a function of the proximity relation of the respective mobile terminal(s) and one or more of the other mobile terminals, and as a function of the observed current location(s) of the respective other mobile terminal(s), as shown in block 404. The observed current location(s) of the mobile terminal(s) may be stored in the location database 122 of the position server 116 and/or forwarded the information to a LBA/LCS client 120 at any point after being received at the position server. Likewise, the estimate(s) of the unobserved current location(s) may be stored in the location database and/or forwarded the information to a LBA/LCS client at any point after being calculated by the position server.

The estimate(s) of the unobserved current location(s) may be calculated in any of a number of different manners. In one example, estimate(s) of the unobserved current location(s) may be calculated at a plurality of time instances which may be delineated by respective timestamps. Two example embodiments of calculating the estimate(s) are described below.

A. First Example Embodiment

In a first example embodiment of calculating estimate(s) of the unobserved current location(s) of mobile terminal(s) 110, consider the following variables.

N: The number of mobile terminals.

M: The number of timestamps, which in one example may be evenly sampled.

$p_{ij}=(x^i_j, y^i_j)$: The position of the i-th terminal at the j-th timestamp. This represents the two-dimensional (2-D) case, but may be easily extended to the three-dimensional (3-D) case.

$P=\{p_{ij}|0\le i<N, 0\le j<M\}$: A set of the positions of all of the N terminals—observed and unobserved—at all M of the timestamps.

$\bar{P}=\{\bar{p}_{ij}\}$: A set of observed positions. Note that $|\bar{P}|<|P|$ since at least some of the positions are unobserved.

$\hat{P}=\{\hat{p}_{ij}|0\le i<N, 0\le j<M\}$: A set of estimated positions. $|\hat{P}|=|P|=NM$.

$b_{i_0,i_1,j}$: A Boolean value, where $0\le i_0<i_1<N$. The variable $b_{i_0,i_1,j}$=true in an instance in which the $i_0$-th terminal and the $i_1$-th terminal are "nearby" at the j-th timestamp—known also as a proximity relation; otherwise, $b_{i_0,i_1,j}$=false.

The first example embodiment may be formulated as an optimization problem. For an optimization problem, an objective function and a set of constraints may be defined and solved for an unknown variable. The objective function may be heuristic in instances in which it is assumed that the mobile terminals 110 are moving smoothly. And the constraints may be defined to match the observed data, including observed positions and observed proximity relations.

To be more specific in one example, the optimization problem may be represented as follows:

$$\hat{P} = \underset{P}{\mathrm{argmin}} \sum_{0 \le i < N, 1 \le j < M-1} |(x^i_{j+1} + x^i_{j-1} - 2x^i_j, y^i_{j+1} + y^i_{j-1} - 2y^i_j)| \quad (1a)$$

subject to, $$\{\hat{p}_{ij}=\bar{p}_{ij}|\bar{p}_{ij}\in \bar{P}\} \quad (1b)$$

$$\{d(p_{i_0,j},p_{i_1,j})\le r_{i_0,i_1,j}|b_{i_0,i_1,j}=true\} \quad (1c)$$

$$\{d(p_{i_0,j},p_{i_1,j})>r|b_{i_0,i_1,j}=false\} \quad (1d)$$

In the objective function (1a), |(x,y)| represents the norm of the vector (x, y); for example, |(x, y)| can be defined as |(x, y)|=|x|+|y|. This function may estimate the positions as to minimize the objective function, which may be interpreted as the sum of absolute values of the acceleration of all of the N terminals 110 at all of the M timestamps.

In a first constraint (1b), observed positions may be simply copied as part of the estimated unobserved positions.

A second constraint (1c) may satisfy proximity relations between terminals. In the second constraint d(p, p') represents a distance between two positions p and p'; for example, d(p, p') may be defined as d(p, p')=|p−p'|. Also in 1(c), $r_{i_0,i_1,j}$ represents a constant selected based on the means (e.g., WLAN, Bluetooth, IrDA, etc.) by which $b_{i_0,i_1,j}$=true may be observed. For example, if at the j-th timestamp, the $i_0$-th terminal 110 discovers the $i_1$-th terminal through Bluetooth, then $r_{i_0,i_1,j}$ may be defined as a Bluetooth discovery range (e.g., the maximum distance at which two terminals can still discover one another through Bluetooth).

A third constraint (1d) may satisfy non-proximity relations between terminals. In the third constraint (1d), r represents a constant; for example, r may be defined as the maximum between the discovery ranges of the means by which the terminals 110 may discover one another (e.g., Bluetooth, IrDA, WLAN)—which in one example may be limited to means adopted by the position server 116. It should be noted that due to instability of wireless communication, a "not found" may not necessarily indicate non-proximity; and as such, the third constraint may not be employed in various instances.

After defining the objective function and set of constraints, they may be solved for an unknown variable—in this instance, estimate(s) of position(s) of one or more of the N mobile terminals 110. The function and constraints may be solved in any of a number of different manners. In one example, the function and constraints may be solved by linear programming, including the simplex method, interior point method or the like.

Figure 5:
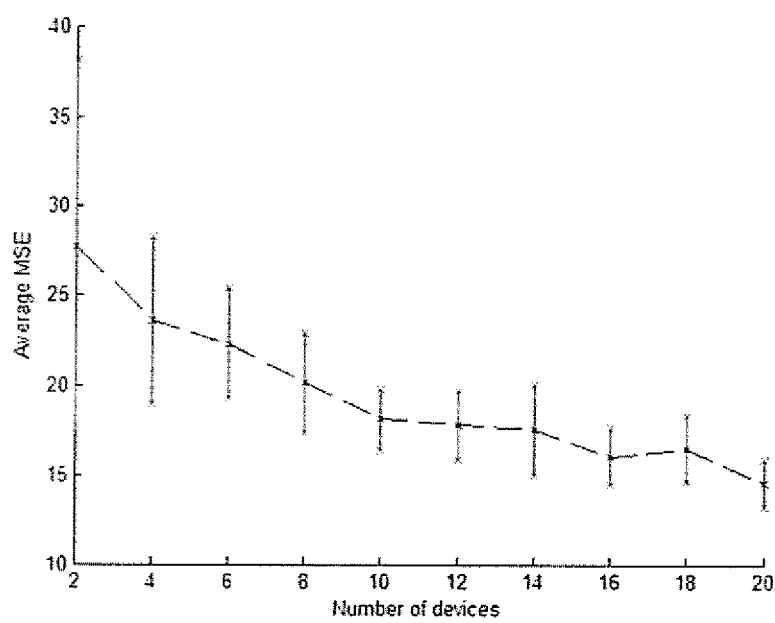
FIG. 5 is a chart illustrating simulation results from implementing an example embodiment of the present invention.

FIG. 5 illustrates the results of simulations that have been conducted to verify the effectiveness of the first example embodiment. In one simulation, $N\in[2, 20]$, M=10 and the positions (observed and unobserved) were randomly generated within the range of $\{(x, y)|x\in[-5, 5], y\in[-5, 5]\}$. From all of the positions, half of them were randomly selected as observed positions. Also in the simulations, proximity between terminals (terminals being "nearby" one another) was defined as their Manhattan distance being less than r=7.0 at a timestamp. The object function and constraints were then solved to calculate estimates of the unobserved positions. For each N value, ten tests were run to provide sufficient statistics.

For simulation results, the estimate(s) of the unobserved positions were compared to their randomly-generated values, and their differences were calculated in terms of mean squared error (MSE). The relationship between MSE and N value is shown in FIG. 5. As shown, more terminals 110 may lead to a lower MSE, which may indicate that a higher density of mobile terminals may facilitate higher positioning accuracy.

B. Second Example Embodiment

In a second example embodiment of calculating estimate(s) of the unobserved current location(s) of mobile terminal(s) 110, consider the following variables some of which may be similar to variables in the first example embodiment.

N: The number of mobile terminals.

M: The number of timestamps, which in one example may be evenly sampled.

$p_{ij}$: The position of the i-th terminal at the j-th timestamp. Since positions may have uncertainty, this variable may be defined as a random variable.

$$q_{ij}(p_{ij}=x) = \frac{1}{\sqrt{2\pi}\,\sigma_{ij}} e^{-\frac{(x-\mu_{ij})^2}{2\sigma_{ij}^2}} \; ;$$

The Gaussian distribution that, as a random variable, $p_{ij}$ follows, where $\mu_{ij}$ and $\sigma_{ij}^2$ represent the mean value and variance, respectively. This represents the one-dimensional (1-D) case, but may be easily extended to the two-dimensional (2-D) and three-dimensional (3-D) cases.

$Q=\{(\mu_{ij}, \sigma_{ij}^2)|0\le N, 0\le j<M\}$: A set of the mean and variance position parameters, which determine the distributions of the positions of all of the N terminals at all of the M timestamps.

$\bar{Q}=\{(\bar{\mu}_{ij}, \bar{\sigma}_{ij}^2)\}$: A set of observed position parameters. Note that $|\bar{Q}|<|Q|$ since not all of the positions are observed.

$$\hat{Q} = \{(\hat{\mu}_{ij}, \sigma_{ij}^2) \mid 0 \le i < N, 0 \le j < M\};$$

A set of estimated position parameters. $|\hat{Q}|=|Q|=NM$.

$b_{i_0,i_1,j}$: A Boolean value, where $0 \le i_0 < i_1 < N$. The variable $b_{i_0,i_1,j}$=true in an instance in which the $i_0$-th terminal and the $i_1$-th terminal are "nearby" at the j-th timestamp—known also as a proximity relation; otherwise, $b_{i_0,i_1,j}$=false.

Similar to the first example embodiment, the second example embodiment may be formulated as an optimization problem, but for this optimization problem, an objective function may be defined without any constraints.

In one particular example, the objective function may be represented as follows:

$$\hat{Q} = \underset{Q}{\operatorname{argmin}} \prod_{0 \le i < N, 1 \le j < M-1} Prob(|p_{i(j+1)} + p_{i(j-1)} - 2p_{ij}| \le a_{ij}) \quad (2)$$

$$\prod_{(\overline{\mu}_{ij}, \sigma_{ij}^2) \in \overline{Q}} Prob(|p_{ij} - \overline{p}_{ij}| \le g_{ij})$$

$$\prod_{b_{i_0,i_1,j}=true} Prob(|p_{i_0 j} - p_{i_1 j}| \le r_{i_0,i_1,j})$$

$$\prod_{b_{i_0,i_1,j}=false} Prob(|p_{i_0 j} - p_{i_1 j}| > r)$$

Since the sum or difference of two Gaussian variables also follows Gaussian distribution, objective function (2) may be rewritten with the so-called Gauss error function; and thus, the optimization problem may be considered nonlinear.

In objective function (2), Prob(e) represents for the probability of a random event e. Accordingly, estimation of position parameters (mean and variance) may be to maximize the probabilities of the following random events: 1) mobile terminals 110 are moving smoothly, 2) observed position parameters are accurate, and 3) the proximity relations between pairs of terminals are accurate. In this regard, the accuracy of the proximity relations between pairs of terminals may be broken into the following events: 3a) pairs of terminals are "nearby" in an instance in which their proximity relation indicates they are nearby, and 3b) pairs of terminals are not "nearby" in an instance in which their proximity relation does not indicate they are nearby (or they have no proximity relation). These four random events correspond to the four products in function (2).

In the first product, $\alpha_{ij}$ represents a constant that evaluates the possible acceleration of the terminal.

In the second product, $\overline{p}_{ij}$ represents the random variable that follows Gaussian distribution with parameters ($\overline{\mu}_{ij}$, $\overline{\sigma}_{ij}^2$); and $g_{ij}$ represents a constant that evaluates the possible error during observation of position parameters.

In the third product, $r_{i_0,i_1,j}$ represents a constant selected based on the means (e.g., WLAN, Bluetooth, IrDA, etc.) by which $b_{i_0,i_1,j}$=true may be observed. For example, if at the j-th timestamp, the $i_0$-th terminal 110 discovers the $i_1$-th terminal through Bluetooth, then this $r_{i_0,i_1,j}$ can be defined as a Bluetooth discovery range (e.g., the maximum distance at which two terminals can still discover one another through Bluetooth).

In the fourth product, r represents a constant; for example, r may be defined as the maximum between the discovery ranges of the means by which the terminals 110 may discover one another (e.g., Bluetooth, IrDA, WLAN)—which in one example may be limited to means adopted by the position server 116. It should again be noted that due to instability of wireless communication, "not found" may not necessarily indicate non-proximity; and as such, the fourth product may not be employed in various instances.

After defining the objective function, the function may be solved for an unknown variable—in this instance, estimate(s) of position(s) of one or more of the N mobile terminals 110. The function may be solved in any of a number of different manners. In one example, the function may be solved by nonlinear programming, including the direct search method, simulated annealing method or the like. For more information on a suitable direct search method, see R. Hooke et al., "*Direct Search" Solution of Numerical and Statistical Problems*, 8 J. Ass. Comput. Mach. 212-29 (1961).

According to one aspect of the example embodiments of present invention, functions performed by the mobile terminal 110, position server 116 and/or apparatus 200, such as those illustrated by the flowcharts of FIGS. 3 and 4, may be performed by various means. It will be understood that each block or operation of the flowcharts, and/or combinations of blocks or operations in the flowcharts, can be implemented by various means. Means for implementing the blocks or operations of the flowcharts, combinations of the blocks or operations in the flowcharts, or other functionality of example embodiments of the present invention described herein may include hardware, alone or under direction of one or more computer program code instructions, program instructions or executable computer-readable program code instructions from a computer-readable storage medium. In this regard, program code instructions may be stored on a memory device, such as the memory device 204 of the example apparatus, and executed by a processor, such as the processor 202 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowcharts by a processor, or storage of instructions associated with the blocks or operations of the flowcharts in a computer-readable storage medium, supports combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code, the at least one memory and the computer program code configured to, with the at least one processor, cause the apparatus to at least:
   receive proximity information from a plurality of mobile apparatuses located remote from the apparatus, the proximity information received from each of the plurality of mobile apparatuses indicating any other mobile apparatuses in proximity of a respective one of the plurality of mobile apparatuses;
   receive geographical location information from at least some but not all of the plurality of mobile apparatuses, the geographical location information received from each mobile apparatus of the at least some of the plurality of mobile apparatuses including an observed current location of the respective mobile apparatus;
   determine a proximity relation between certain ones of the plurality of mobile apparatuses, proximity of the certain ones of the plurality of mobile apparatuses to one another being reflected by the proximity information received from the plurality of mobile apparatuses from which geographical location information was received and one or more remaining mobile apparatuses from which geographical location information was not received; and
   calculate an estimate of a current location of at least one of the one or more remaining mobile apparatuses from which geographical location information was not received as a function of the proximity relation between the certain ones of the plurality of mobile apparatuses, and as a function of the observed current locations of the plurality of mobile apparatuses from which geographical location information was received.

2. The apparatus of claim 1, wherein the proximity information received from each mobile apparatus identifies any other mobile apparatuses discovered by the mobile apparatus as being in proximity of the mobile apparatus.

3. The apparatus of claim 2, wherein being configured to cause the apparatus to determine a proximity relation between certain ones of the plurality of mobile apparatuses includes being configured to cause the apparatus to, for at least one mobile apparatus, relate the mobile apparatus and any other mobile apparatuses identified in the proximity information received from the mobile apparatus.

4. The apparatus of claim 1, wherein the proximity information received from each mobile apparatus identifies any access points discovered by the mobile apparatus as being in proximity of the mobile apparatus.

5. The apparatus of claim 4, wherein being configured to cause the apparatus to determine a proximity relation between certain ones of the plurality of mobile apparatuses includes being configured to cause the apparatus to relate at least one and another of the mobile apparatuses in an instance in which the proximity information received from the respective mobile apparatuses identifies at least one common access point.

6. The apparatus of claim 1, being configured to cause the apparatus to calculate an estimate of a current location of at least one of the one or more remaining mobile apparatuses from which geographical location information was not received includes being configured to cause the apparatus to solve an optimization problem including an objective function and a set of constraints.

7. The apparatus of claim 6, wherein the objective function is defined to minimize the sum of absolute values of acceleration of the plurality of mobile apparatuses at a plurality of time instances, and wherein the set of constraints are defined to match the observed current locations of the at least some of the plurality of mobile apparatuses, and the proximity relation between certain ones of the number of mobile apparatuses.

8. The apparatus of claim 1, wherein being configured to cause the apparatus to calculate an estimate of a current location of at least one of the one or more remaining mobile apparatuses from which geographical location information was not received includes being configured to cause the apparatus to solve an optimization problem including an objective function without any constraints.

9. The apparatus of claim 8, wherein the objective function is defined to maximize probabilities of a number of random events, including that the observed current locations are accurate, and that the proximity relation between certain ones of the number of mobile apparatuses is accurate.

10. The apparatus of claim 1, wherein the at least one memory and the computer program code are further configured to, with the at least one processor, cause the apparatus to further:
    prepare a request for transmission to at least one of the plurality of mobile apparatuses, the apparatus being caused to receive at least one of proximity information or geographical information from the respective at least one of the plurality of mobile apparatuses in response to the request.

11. A method comprising:
    receiving proximity information from a plurality of apparatuses, the proximity information received from each of the plurality of apparatuses indicating any other apparatuses in proximity of a respective one of the plurality of apparatuses;

receiving geographical location information from at least some but not all of the plurality of apparatuses, the geographical location information received from each apparatus of the at least some of the plurality of apparatuses including an observed current location of the respective apparatus;

determining a proximity relation between certain ones of the plurality of apparatuses, proximity of the certain ones of the plurality of apparatuses to one another being reflected by the proximity information received from the plurality of apparatuses from which geographical location information was received and one or more remaining apparatuses from which geographical location information was not received; and calculating an estimate of a current location of at least one of the one or more remaining apparatuses from which geographical location information was not received as a function of the proximity relation between the certain ones of the plurality of apparatuses, and as a function of the observed current locations of the plurality of apparatuses from which geographical location information was received.

12. The method of claim 11, wherein the proximity information received from each apparatus identifies any other apparatuses discovered by the apparatus as being in proximity of the apparatus.

13. The method of claim 12, wherein determining a proximity relation between certain ones of the plurality of apparatuses includes, for at least one apparatus, relating the apparatus and any other apparatuses identified in the proximity information received from the apparatus.

14. The method of claim 11, wherein the proximity information received from each apparatus identifies any access points discovered by the apparatus as being in proximity of the apparatus.

15. The method of claim 14, wherein determining a proximity relation between certain ones of the plurality of apparatuses includes relating at least one and another of the apparatuses in an instance in which the proximity information received from the respective apparatuses identifies at least one common access point.

16. The method of claim 11, wherein calculating an estimate of a current location of at least one of the one or more remaining apparatuses from which geographical location information was not received includes solving an optimization problem including an objective function and a set of constraints.

17. The method of claim 16, wherein the objective function is defined to minimize the sum of absolute values of acceleration of the plurality of apparatuses at a plurality of time instances, and wherein the set of constraints are defined to match the observed current locations of the at least some of the plurality of apparatuses, and the proximity relation between certain ones of the number of apparatuses.

18. The method of claim 11, wherein calculating an estimate of a current location of at least one of the one or more remaining apparatuses from which geographical location information was not received includes solving an optimization problem including an objective function without any constraints.

19. The apparatus of claim 11 further comprising:
preparing a request for transmission to at least one of the plurality of apparatuses, wherein at least one of receiving proximity information or receiving geographical information includes receiving proximity information or receiving geographical information from the respective at least one of the plurality of apparatuses in response to the request.

20. A non-transitory computer-readable storage medium having computer-readable program code portions stored therein, the computer-readable storage medium and computer-readable program code portions being configured to, with at least one processor, cause an apparatus to at least:

receive proximity information from a plurality of mobile apparatuses located remote from the apparatus, the proximity information received from each of the plurality of mobile apparatuses indicating any other mobile apparatuses in proximity of a respective one of the plurality of mobile apparatuses;

receive geographical location information from at least some but not all of the plurality of mobile apparatuses, the geographical location information received from each mobile apparatus of the at least some of the plurality of mobile apparatuses including an observed current location of the respective mobile apparatus;

determine a proximity relation between certain ones of the plurality of mobile apparatuses, proximity of the certain ones of the plurality of mobile apparatuses to one another being reflected by the proximity information received from the plurality of mobile apparatuses from which geographical location information was received and one or more remaining mobile apparatuses from which geographical location information was not received; and calculate an estimate of a current location of at least one of the one or more remaining mobile apparatuses from which geographical location information was not received as a function of the proximity relation between the certain ones of the plurality of mobile apparatuses, and as a function of the observed current locations of the plurality of mobile apparatuses from which geographical location information was received.

* * * * *